United States Patent Office 2,805,709
Patented Sept. 10, 1957

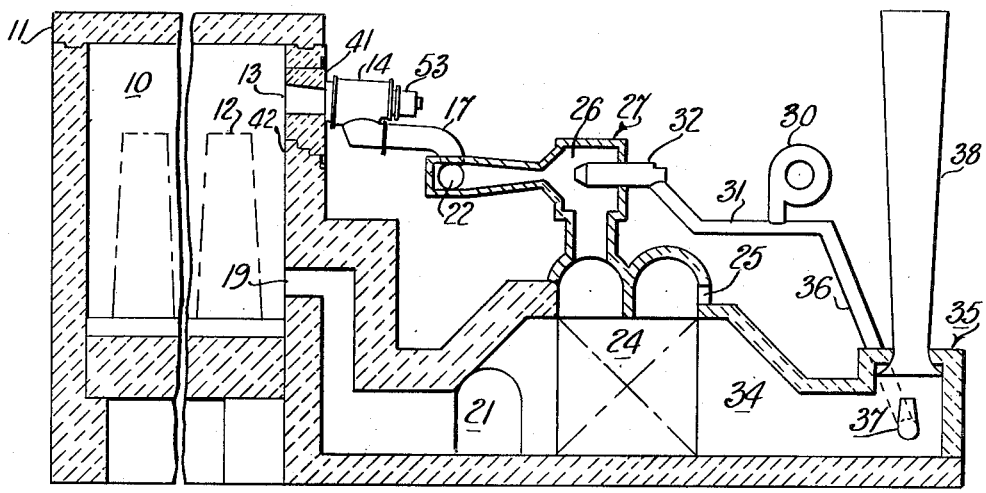

2,805,709
BURNER PORT STRUCTURE

William H. Dailey, Jr., Toledo, Ohio, assignor to Surface Combustion Corporation, Toledo, Ohio, a corporation of Ohio Application May 26, 1954, Serial No. 432,376

6 Claims. (Cl. 158—1)

This invention relates to burner apparatus for burning fuel in furnaces such as soaking pit furnaces, and is designed to provide a burner which is adaptable to relative expansion of steel metal and refractory portions of the furnace without affecting the efficiency thereof and which is much simplified yet most serviceable in its intended operation.

Large furnaces such as soaking pits often have burner ports in side walls formed by aligned apertures in adjacent refractory lining and steel binding or shell portions of the wall. In such furnaces there is a constant problem of maintaining a continuous refractory lining for the side wall about the refractory aperture, and maintaining the aperture aligned with the steel binding or shell and the burner apparatus supported thereon. When relative expansion or other forces opens a path through the refractory lining to the steel binding or shell, and opens a space between the lining and the binding or shell, combustible mixtures pass through the path and burn adjacent the binding or shell, causing overheating of the binding or shell, warpage, and early failure of the wall, especially the steel binding or shell.

This invention provides a furnace lining movable adjacent the steel binding or shell without strain upon the structure and without opening such paths or spaces, and by a pre-arranged misalignment of refractory burner port lining with the burner when the structure is cold, the structure is maintained in proper alignment at operating temperatures. Special structure maintains a refractory nozzle portion of the burner port positioned in the refractory wall and suitably aligned with the steel binding or shell.

This application is a continuation-in-part of my application Serial No. 257,019 filed Nov. 19, 1951.

For a consideration of what I believe to be novel and my invention, attention is directed to the following portions of this specification, the drawing, and the concluding claims hereof.

In the drawing:

Fig. 1 is a diagrammatic representation of soaking pit furnace apparatus to which the invention is applied.

Fig. 2 is a vertical, longitudinal sectional view of the burner generally illustrated in Fig. 1.

Fig. 3 is an enlarged view of a portion of the burner of Fig. 2.

Fig. 4 is an enlarged view of an alternate construction for the portion of Fig. 3.

The soaking pit comprises a combined combustion and heating chamber 10 which is normally closed by a removable cover 11, the chamber being of a size to contain a plurality of steel ingots 12 indicated in outline by discontinuous lines. Heating flame enters the chamber 10 from a firing or burner port 13 whose inlet is coincident with the outlet of a burner 14 to which fuel is delivered from a fuel supply box 53 and air for combustion is delivered by a duct 17. Flue gas is vented from the chamber 10 through an exhaust port 19. The heating unit thus far described is a single soaking pit furnace, or hole, and is customarily one of several units in a battery having a common flue gas exhaust manifold 21 and a common burner air distributing manifold 22.

Air may be delivered to the air manifold 22 by any conventional means, and may be preheated by a recuperator 24 as herein shown. Air is drawn into the recuperator 24 through entry port 25 and is heated in the recuperator before passing into the plenum chamber 26 of a jet pump 27 from which it is inspirated by a jet of air from a compressor 30, pipe 31 and jet nozzle 32 and delivered by manifold 22 and pipe 17 to the burner 14.

Flue gases from the chamber 10 pass through the exhaust port 19 to the exhaust manifold 21, through the recuperator 24 wherein some of its heat is transferred to the air drawn therethrough, and thence through exhaust duct 34 to an ejector 35 where a jet of air from the compressor 30, pipe 36 and a nozzle 37 inspirates exhaust flue gases from the duct 34 and delivers them through a venturi stack 38 of the ejector 35.

The burner port is formed in a cast ceramic burner block 41 which is supported on the furnace lining 42 to be substantially integral therewith and upon relative expansion of the lining with the steel furnace binding or shell 40, which may be as much as four inches from cold to operating temperature, the furnace lining and the burner block move as a unit with respect to the binding or shell. The burner block may be cast in place in the furnace wall. A flanged frame 43 supports the burner block and moves therewith in a plane parallel to the binding or shell. It is retained next adjacent the burner and the steel binding, or shell 40 of the furnace by a retainer track or guide 44 welded thereto. An annular refractory ring 45 is retained in the pit binding forming a conduit between the burner block 41 and the burner 14, the ring being thicker at the top than at the bottom to allow the burner 14 to be inclined from the horizontal. An extended sleeve portion 46 of the furnace binding or shell 40 encloses the ring 45 and terminates in a flange 47 to which the burner 14 is secured. This also allows a standard burner assembly to be assembled at any desired angle for a given furnace design. As the refractory lining 42 of the furnace expands with relation to the steel binding or shell 40 thereof, the ring 46 and the burner 14 remain secured to the steel while the burner block moves with the refractory, the flange frame 43 of the burner block (and consequently the monolithic burner block and refractory wall structure) being retained next adjacent the steel binding or shell by the track 44 wherein it moves. The lower portion of the burner block is stepped so that the brick of the furnace lining therebelow cannot shift to open a path below the monolithic burner block through which the heat of the chamber 10 may "see" the steel binding or shell, and by radiation over-heat it, a difficulty inherent in prior designs. A similar step design for the top portion is illustrated in Fig. 4 which also serves another another function of keying the burner block 41 to the furnace refractory lining 42 so that the burner block cannot loosen from the flange 43 and fall inwardly toward the chamber 10. Another device for preventing the burner block from falling away from the binding or shell 40 is shown in Fig. 4 and comprises a key member 49 secured to the flanged frame 43 and disposed in a recess in the burner block to hold the same in position with the frame 43 against the binding or shell 40. Figs. 3 and 4 illustrate the clearance required about the guide 44 in the refractory 42 which allows the refractory lining to move with respect to the guide 44 and also allows the frame 43 to move in the guide 44. This design, especially as illustrated in Figs. 2 and 3, is well adapted to the procedure of casing the burner block in place in the refractory lining.

This burner and furnace design provides a sealed burner port in which the burner block is properly aligned with the burner under normal operating conditions, yet opens no gaps between the refractory furnace lining and the burner block through which heat and combustion gases may pass to burn out the furnace steel binding or shell and thus cause serious gas leakage and unbalance of air-gas mixture, which in turn affects the efficiency of the furnace and the character of the atmosphere maintained therein. This invention is accordingly well suited to its intended purpose.

I claim:

1. In a furnace, in combination: a metal shell and a refractory lining forming a wall of the furnace, said shell and lining having aligned apertures in the wall; a burner port block disposed in the aperture of the lining and integral with the lining; flange means on the block and adjacent the shell; guide means secured to the shell and forming an integral part thereof confining the flange means to a plane parallel to the shell while allowing relative movement thereof in said plane, said guide means forming a recess in said plane to accommodate said movement; and burner means supported on and sealed gas tight to the shell for delivering fuel and air for combustion to the burner port through said apertures.

2. In a furnace, in combination: a metal shell and a refractory lining forming a wall of the furnace, said shell and lining having aligned apertures in the wall; a burner port block disposed in the aperture of the lining and integral with the lining; flange means on the block and adjacent the shell; guide means secured to the shell and forming an integral part thereof confining the flange means to a plane parallel to the shell while allowing relative movement thereof in said plane, said guide means forming a recess in said plane to accommodate said movement; burner means supported on and sealed gas tight to the shell for delivering fuel and air for combustion to the burner port through said apertures; and a refractory ring having an inclined face disposed in the aperture in the shell between the lining and the burner means, aligned with the burner block, and forming a conduit from the burner means to the burner block.

3. In a furnace, in combination: a metal shell and a refractory lining forming a wall of the furnace, said shell and lining having aligned apertures in the wall; a burner port block disposed in the aperture of the lining and integral with the lining; flange means on the lining; and guide means secured to the shell and forming an integral part thereof confining the flange means to a plane parallel with the shell while allowing relative movement thereof in said plane, said guide means forming a recess in said plane to accommodate said movement.

4. In a furnace, in combination: a metal shell and refractory lining forming a wall of the furnace, said shell and lining having aligned apertures in the wall; a burner port block disposed cast in place in the aperture of the lining and forming part thereof; flange means on the lining and adjacent the shell; guide means secured to the shell and forming an integral part thereof confining the flange means to a plane parallel to the shell while allowing relative movement thereof in said plane, said guide means forming a recess in said plane to accommodate said movement; and burner means supported on the shell for delivering fuel and air for combustion to the burner port through said apertures.

5. In a furnace, in combination: a metal shell and a refractory lining forming a wall of the furnace, said shell and lining having aligned apertures in the wall; a burner port block disposed in the aperture of the refractory lining and integral with the lining; flange means on the block adjacent the shell; and guide means secured to the shell and forming an integral part thereof and forming a recess with the lining of said shell confining the flange means to a plane parallel to the shell while allowing and accommodating relative movement thereof, in keyed relation with the refractory lining and in said plane.

6. In a furnace, in combination: a metal shell, and a refractory lining forming a wall of the furnace, said shell and lining having aligned apertures in the wall; a burner port block disposed in the aperture of the refractory lining and integral with the lining; flange means on one of said shell and burner block; and guide means on the other of said shell and burner block, and in fixed relation thereto confining the flange means to a plane parallel with the shell while allowing relative movement thereof in said plane, said guide means forming a recess in said plane to accommodate said movement.

References Cited in the file of this patent

UNITED STATES PATENTS

| | | |
|---|---|---|
| 1,869,242 | Frame | July 26, 1932 |
| 2,561,795 | Hess et al. | July 24, 1951 |

FOREIGN PATENTS

| | | |
|---|---|---|
| 394,789 | Germany | May 6, 1924 |